United States Patent
Hirata

(10) Patent No.: US 12,486,187 B2
(45) Date of Patent: Dec. 2, 2025

(54) WAFER PRODUCTION SYSTEM AND WAFER MANUFACTURING METHOD

(71) Applicant: DISCO CORPORATION, Tokyo (JP)

(72) Inventor: Kazuya Hirata, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 22 days.

(21) Appl. No.: 18/296,437

(22) Filed: Apr. 6, 2023

(65) Prior Publication Data
US 2023/0331614 A1    Oct. 19, 2023

(30) Foreign Application Priority Data
Apr. 18, 2022 (JP) .................. 2022-068358

(51) Int. Cl.
| | | |
|---|---|---|
| C02F 9/00 | (2023.01) | |
| B23K 26/53 | (2014.01) | |
| B28D 5/00 | (2006.01) | |
| B23K 103/00 | (2006.01) | |
| C02F 1/00 | (2023.01) | |
| C02F 1/32 | (2023.01) | |
| C02F 1/36 | (2023.01) | |
| C02F 1/42 | (2023.01) | |
| C02F 1/44 | (2023.01) | |
| C02F 101/30 | (2006.01) | |
| C02F 103/04 | (2006.01) | |

(52) U.S. Cl.
CPC ............... *C02F 9/00* (2013.01); *B23K 26/53* (2015.10); *B28D 5/0011* (2013.01); *B23K 2103/56* (2018.08); *C02F 1/004* (2013.01); *C02F 1/32* (2013.01); *C02F 1/36* (2013.01); *C02F 1/42* (2013.01); *C02F 1/444* (2013.01); *C02F 2101/30* (2013.01); *C02F 2103/04* (2013.01); *C02F 2209/02* (2013.01); *C02F 2301/046* (2013.01)

(58) Field of Classification Search
CPC ... B23K 26/33; B28D 5/0011; B32K 2103/56
USPC ....................................... 264/400
See application file for complete search history.

(56) References Cited

U.S. PATENT DOCUMENTS 10,865,130 B2    12/2020    Jizaimaru

FOREIGN PATENT DOCUMENTS

| DE | 102019200729 A1 * | 7/2019 | ......... B23K 26/0006 |
|---|---|---|---|
| JP | 2000094221 A | 4/2000 | |
| JP | 2002307080 A | 10/2002 | |
| JP | 2016111143 A | 6/2016 | |

(Continued)

OTHER PUBLICATIONS

English translation of DE102019200729 (Year: 2019).*
Office Action issued in counterpart Singapore patent application No. 10202300856S, dated Aug. 14, 2025.

*Primary Examiner* — Christina A Johnson
*Assistant Examiner* — Xue H Liu
(74) *Attorney, Agent, or Firm* — Greer Burns & Crain Ltd.

(57) ABSTRACT

A water production system includes a filter unit that filters water to produce clear water, an ultraviolet light irradiator that irradiates, with ultraviolet light, the clear water produced by the filter unit, thereby degrading organic matter in the clear water, an ion exchange resin unit that purifies the clear water, in which the organic matter has been degraded by the ultraviolet light irradiator, into pure water, and a deaerated water production unit that deaerates the pure water to produce deaerated water.

7 Claims, 4 Drawing Sheets

(56) References Cited

FOREIGN PATENT DOCUMENTS

| | | | | |
|---|---|---|---|---|
| JP | 2016146446 | A | 8/2016 | |
| TW | 1710529 | B * | 11/2020 | ............. B01D 61/48 |

* cited by examiner

WAFER PRODUCTION SYSTEM AND WAFER MANUFACTURING METHOD

BACKGROUND OF THE INVENTION

Field of the Invention

The present invention relates to a wafer production system, and also to a wafer manufacturing method for manufacturing a wafer from an ingot.

Description of the Related Art

Devices such as integrated circuits (ICs), large-scale integration (LSI) circuits, or light emitting diodes (LEDs) are formed by stacking a function layer over a front surface of a wafer that uses a material such as silicon (Si) or sapphire ($Al_2O_3$), and demarcating the function layer into individual regions with scheduled division lines that intersect each other. Further, power devices, LEDs, or the like are formed by stacking a function layer over a front surface of a wafer that uses a material such as silicon carbide (SiC), and demarcating the function layer into individual regions with scheduled division lines that intersect each other.

A wafer with devices formed thereon is subjected to processing along the scheduled division lines by a cutting machine or a laser processing machine, so that the wafer is divided into individual device chips. The individual device chips thus divided are used in electronic equipment such as mobile phones or personal computers.

A wafer on which devices are to be formed is generally manufactured by slicing a cylindrical ingot with a wire saw (see, for example, Japanese Patent Laid-open No. 2000-94221). The thus-manufactured wafer is subjected to polishing at a front surface and a back surface thereof, so that the front surface and the back surface are finished into mirror surfaces.

If wafers are sliced from an ingot with a wire saw and are then subjected to polishing at their front and back surfaces, however, a large part (70% to 80%) of the ingot is discarded, thereby raising a problem that such a wafer manufacturing method is uneconomical. In particular, an SiC ingot has high hardness, cannot easily be sliced by a wire saw, and requires a significant amount of time to slice, so that the productivity of SiC wafers is poor. Moreover, SiC ingots themselves have a high price per piece. Therefore, for efficient manufacture of wafers, especially SiC wafers, there are still problems to be solved.

Hence, the present applicant has proposed a technique, which irradiates an SiC ingot with a laser beam having a wavelength transmittable through SiC with a focal point of the laser beam positioned inside the SiC ingot to form a separation starting point on a separation plane, and separates a wafer from the SiC ingot along the separation plane where the separation starting point has been formed (see, for example, Japanese Patent Laid-open No. 2016-111143).

The present applicant has also proposed another technique, which applies ultrasonic waves to an ingot via a layer of water to facilitate the separation of a wafer, which is to be manufactured, from the ingot (see, for example, Japanese Patent Laid-open No. 2016-146446).

SUMMARY OF THE INVENTION

Meanwhile, the application of ultrasonic waves to an ingot with a separation starting point formed therein can improve the separability of a wafer, but a certain amount of time is needed until the wafer separates from the ingot. It is therefore desired to shorten the time from initiation of the application of ultrasonic waves until completion of the separation of a wafer.

Such a desire can also arise in a case where a wafer is separated from an ingot of silicon, sapphire, or the like by forming a separation starting point in the ingot through irradiation of the ingot with a laser beam having a wavelength transmittable through the ingot with a focal point of the laser beam positioned inside the ingot.

Accordingly, the present invention has as an object thereof provision of a water production system for producing water that allows efficient propagation of ultrasonic waves therethrough, and a wafer manufacturing method in which a wafer can efficiently be separated.

In accordance with an aspect of the present invention, there is provided a water production system including a filter unit that filters water to produce clear water, an ultraviolet light irradiator that irradiates, with ultraviolet light, the clear water produced by the filter unit, thereby degrading organic matter in the clear water, an ion exchange resin unit that purifies the clear water, in which the organic matter has been degraded by the ultraviolet light irradiator, into pure water, and a deaerated water production unit that deaerates the pure water to produce deaerated water.

Preferably, the deaerated water production unit may be arranged between the filter unit and the ultraviolet light irradiator, between the ultraviolet light irradiator and the ion exchange resin unit, or on a downstream side of the ion exchange resin unit.

Preferably, the deaerated water production unit may include a chamber, a water receiving port through which the pure water is received into the chamber, a depressurizer that reduces pressure in the chamber, an ultrasonic oscillator that applies ultrasonic waves to the pure water in the chamber, and a deaerated water outflow port through which the deaerated water flows out of the chamber.

Preferably, the ultrasonic oscillator may generate ultrasonic waves of 0.1 to 1.0 MHz, and the depressurizer may reduce the pressure to 0.2 atm or lower in the chamber. Preferably, the deaerated water production unit may produce deaerated water having an oxygen content of 2.0 mg/L or lower.

Preferably, the deaerated water production unit may be arranged in a circulation route that supplies the deaerated water to a deaerated water use machine and receives used deaerated water drained from the deaerated water use machine.

Preferably, the water production system may further include a microfilter and a temperature controller both arranged on a downstream side of the ion exchange resin unit. Preferably, the water production system may further include a waste water tank arranged on an upstream side of the filter unit to hold waste water therein.

In accordance with another aspect of the present invention, there is provided a wafer manufacturing method for manufacturing a wafer from an ingot. The method includes a separation starting point forming step of forming a separation starting point by forming modified layers through irradiation of the ingot with a laser beam having a wavelength transmittable through the ingot with a focal point of the laser beam positioned at a depth from an end face of the ingot, the depth corresponding to a thickness of the wafer to be manufactured, and a separation step of separating the wafer to be manufactured from the ingot, from the separation starting point. In the separation step, deaerated water produced by the above-mentioned water production system is supplied to the end face of the ingot to form a layer of the deaerated water, and ultrasonic waves are applied to the ingot via the layer of the deaerated water, thereby disrupting the separation starting point.

Preferably, the ingot may be an SiC ingot. Preferably, the SiC ingot may have a first surface, a second surface on an opposite side to the first surface, a c-axis extending from the first surface to the second surface, and a c-plane orthogonal to the c-axis, the c-axis may be inclined with respect to a perpendicular to the first surface, and an off-angle may be formed between the c-plane and the first surface. In this case, the separation starting point forming step may include a modified layer forming step of forming a linear modified layer by moving the focal point of the laser beam and the SiC ingot relative to each other in a direction orthogonal to a direction in which the off-angle is formed, and an indexing step of subjecting the focal point of the laser beam and the SiC ingot to index feeding by a predetermined amount by moving the focal point and the SiC ingot relative to each other in the direction in which the off-angle is formed.

With the water production system according to the present invention, it is possible to produce water that allows efficient propagation of ultrasonic waves therethrough.

With the wafer manufacturing method according to the present invention, in the separation step, the deaerated water produced by the above-mentioned water production system is supplied to the end face of the ingot to form the layer of the deaerated water, and the ultrasonic waves are then applied to disrupt the separating starting point. It is therefore possible to efficiently separate the wafer.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

With reference to the attached drawings, description will hereinafter be made about a water production system and a wafer manufacturing method according to a preferred embodiment of the present invention.
(Water Production System 2)

Figure 1:
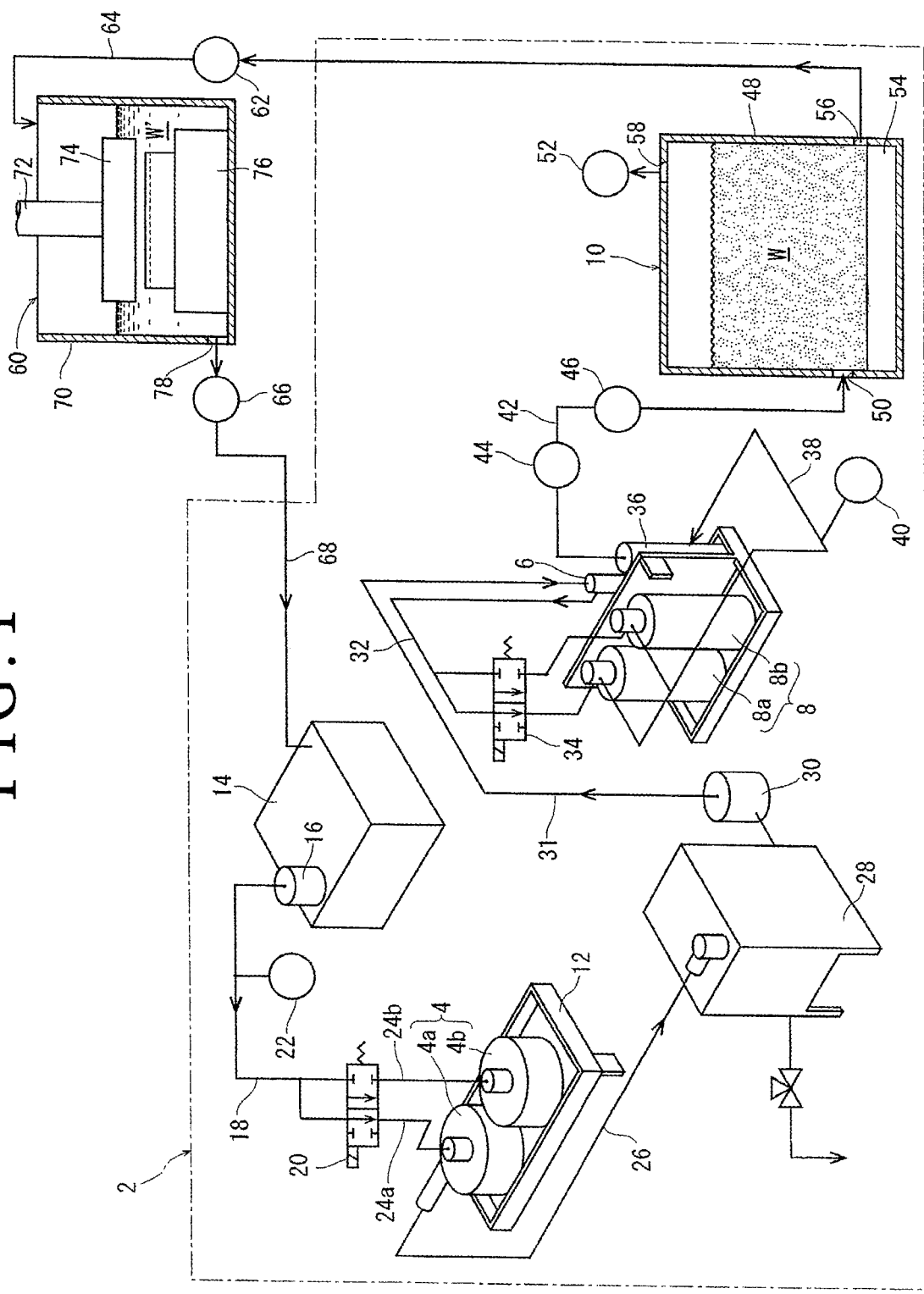
FIG. 1 is a flow diagram of a water production system according to an embodiment of the present invention.

Describing first about the water production system, the water production system denoted as a whole by a reference symbol 2 in FIG. 1 includes a filter unit 4 that filters water to produce clear water, an ultraviolet light irradiator 6 that irradiates, with ultraviolet light, the clear water produced through the filter unit 4, thereby degrading organic matter in the clear water, an ion exchange resin unit 8 that purifies the clear water, in which the organic matter has been degraded by the ultraviolet light irradiator 6, into pure water, and a deaerated water production unit 10 that deaerates the pure water to produce deaerated water.
(Filter Unit 4)

The filter unit 4 in the present embodiment has a first filter 4a and a second filter 4b, and the first and second filters 4a and 4b are arranged in a clear water receiving pan 12 that receives the clear water having been filtered.

Arranged on an upstream side of the filter unit 4 are a waste water tank 14 that holds waste water, and a waste water pump 16 that delivers the waste water from the waste water tank 14. Disposed in a line 18 that connects the waste water pump 16 and the filter unit 4 to each other are a solenoid selector valve 20 and a pressure gauge 22.

During de-energization of the solenoid selector valve 20, the waste water delivered by the waste water pump 16 flows into the first filter 4a through a branch line 24a. Upon energization of the solenoid selector valve 20, on the other hand, the waste water flows into the second filter 4b through another branch line 24b. The waste water flowed into the first or second filter 4a or 4b is filtered into clear water, and the clear water flows out to the clear water receiving pan 12.

When the filtration is continued by the first or second filter 4a or 4b, impurities deposit in the filter in use and cause clogging, so that the pressure gauge 22 indicates an increase in measurement value. When the value of the pressure gauge 22 exceeds a predetermined value, a controller (not illustrated) of the water production system 2 determines that the filter in use has lost its filter function, and actuates the solenoid selector valve 20 to switch the filter into which the waste water is to be allowed to flow. In this manner, the filter that has lost its filter function can be replaced without suspending the operation of the water production system 2.

The controller of the water production system 2 is constituted by a computer including a central processing unit (CPU) that performs arithmetic and logic processing according to a control program, a read only memory (ROM) that stores the control program and the like, and a read/write random access memory (RAN) that stores results of arithmetic and logic operations and the like, and is configured to control the operation of the water production system 2.
(Ultraviolet Light Irradiator 6)

The ultraviolet light irradiator 6 is arranged downstream of the filter unit 4. Disposed between the clear water receiving pan 12 and the ultraviolet light irradiator 6 in the present embodiment are a clear water tank 28 that holds the clear water filtered through the filter unit 4, and a clear water pump 30 that delivers the clear water from the clear water tank 28. The clear water filtered through the filter unit 4 flows into the clear water tank 28 through a line 26. Further, the clear water that has been delivered by the clear water pump 30 from the clear water tank 28 to the ultraviolet light irradiator 6 via a line 31 is irradiated with ultraviolet light in the ultraviolet light irradiator 6. As a result, the clear water is sterilized, and at the same time, organic matter in the clear water is degraded.
(Ion Exchange Resin Unit 8)

The ion exchange resin unit 8 in the present embodiment has a first ion exchange resin column 8a and a second ion exchange resin column 8b. The first and second ion exchange resin columns 8a and 8b are connected to the ultraviolet light irradiator 6 via a line 32, and a solenoid selector valve 34 is disposed in the line 32. During de-energization of the solenoid selector valve 34, the clear water delivered by the clear water pump 30 and passed through the ultraviolet light irradiator 6 is delivered to the first ion exchange resin column 8a. During energization of the solenoid selector valve 34, on the other hand, the clear water passed through the ultraviolet light irradiator 6 is delivered to the second ion exchange resin column 8b.

The clear water delivered to the first or second ion exchange resin column 8a or 8b is then subjected to ion exchange, thereby purifying the clear water into pure water. Owing to the disposition of the solenoid selector valve 34, the first or second ion exchange resin column 8a or 8b through which the passage of the clear water has been stopped can appropriately be replaced while continuing the operation of the water production system 2.

Into the pure water obtained by the purification of the clear water by the ion exchange, finely divided materials such as resin fragments separated from the first or second ion exchange resin column 8a or 8b may mix. Therefore, the water production system 2 may preferably include a microfilter 36 on a downstream side of the ion exchange resin unit 8 to eliminate the above-described finely divided materials.

Disposed in a line 38 that connects the ion exchange resin unit 8 and the microfilter 36 to each other is a detector 40 that detects pressure and resistivity of the pure water in the line 38. If the pressure detected by the detector 40 increases to a predetermined value or greater, the controller of the water production system 2 determines that finely divided materials such as resin fragments separated from the ion exchange resin unit 8 have deposited in the microfilter 36 and the microfilter 36 has lost its filter function, and notifies an operator to that effect. If the resistivity of the pure water as detected by the detector 40 decreases to a predetermined value or smaller, on the other hand, the controller of the water production system 2 determines that the function of the first or second ion exchange resin column 8a or 8b in use has been lowered, and operates the solenoid selector valve 34 to switch the ion exchange resin column through which the clear water is to be passed.

(Deaerated Water Production Unit 10)

In the present embodiment, the deaerated water production unit 10 is arranged on the downstream side of the ion exchange resin unit 8 (in more detail, on a downstream side of the microfilter 36) as illustrated in FIG. 1. It is to be noted that the deaerated water production unit 10 may be arranged between the filter unit 4 and the ultraviolet light irradiator 6 or between the ultraviolet light irradiator 6 and the ion exchange resin unit 8. However, to prevent gas from dissolving back into the deaerated water before its use, the deaerated water production unit 10 may desirably be arranged on the downstream side of the microfilter 36 and immediately before a deaerated water use machine 60 as in the present embodiment.

Arranged in a line 42 that connects the microfilter 36 and the deaerated water production unit 10 to each other are a pure water pump 44 that delivers the pure water, which has been filtered through the microfilter 36, to the deaerated water production unit 10, and a temperature controller 46 that adjusts the temperature of the pure water to be delivered to the deaerated water production unit 10.

The deaerated water production unit 10 includes a chamber 48, a water receiving port 50 through which the pure water is received into the chamber 48, a depressurizer 52 that reduces pressure in the chamber 48, an ultrasonic oscillator 54 that applies ultrasonic waves to the pure water in the chamber 48, and a deaerated water outflow port 56 through which the deaerated water flows out of the chamber 48. In an upper part of the chamber 48, a suction hole 58 is formed. The suction hole 58 is connected to the depressurizer 52 which can be constituted by a vacuum pump.

The above-described water production system 2 is arranged in a circulation route that supplies the deaerated water to the deaerated water use machine 60 (a separation machine in the present embodiment) and receives used deaerated water drained from the deaerated water use machine 60.

The deaerated water produced in the deaerated water production unit 10 is supplied by a deaerated water pump 62 from the deaerated water production unit 10 to the deaerated water use machine 60 via a line 64. On the other hand, the deaerated water used in the deaerated water use machine 60 is delivered by a drain pump 66 from the deaerated water use machine 60 to the waste water tank 14 via a line 68.

(Deaerated Water Use Machine 60: Separation Machine)

The separation machine as the deaerated water use machine 60 includes a water bath 70, a rod 72 arranged movably up and down in an upper part of the water bath 70, and an ultrasonic oscillator 74 mounted on a lower end of the rod 72. Disposed in the water bath 70 is a holding table 76 on which to hold an ingot. On a side of a lower end of the water bath 70, a drain port 78 is formed to drain the used deaerated water.

(Water Production Method)

Describing next about a method for producing water with the water production system 2 as mentioned above, waste water is first delivered by the waste water pump 16 from the waste water tank 14 to the filter unit 4, and the waste water is filtered through the filter unit 4 to produce clear water. The clear water thus produced is temporarily held in the clear water tank 28. The clear water in the clear water tank 28 is then delivered by the clear water pump 30 to the ultraviolet light irradiator 6, where the clear water is irradiated with ultraviolet light to sterilize the clear water, and at the same time, to degrade organic matter in the clear water.

Next, the clear water is caused to flow into the ion exchange resin unit 8 and is purified into pure water. Then, after finely divided materials in the pure water, such as resin fragments separated from the ion exchange resin unit 8, are eliminated by the microfilter 36, the pure water is supplied by the pure water pump 44 from the microfilter 36 to the deaerated water production unit 10. Here, the temperature of the pure water is adjusted to an appropriate temperature (for example, 20° C.) by the temperature controller 46.

After pure water W is supplied into the chamber 48 of the deaerated water production unit 10, the pressure inside the chamber 48 is reduced (for example, to 0.2 atm or lower) by the depressurizer 52, and at the same time, ultrasonic waves (for example, of approximately 0.1 to 1.0 MHz) are applied by the ultrasonic oscillator 54 to the pure water W in the chamber 48. As a result, gas that is dissolved in the pure water W comes out as bubbles, so that the gas is removed from the pure water W, and deaerated water is produced. The deaerated water thus produced can efficiently propagate ultrasonic waves, because impurities and fine bubbles, which absorb energy of the ultrasonic waves, are contained at extremely low levels.

The lower the air pressure in the chamber 48 upon production of deaerated water, the better, because deaeration is promoted more as the pressure is reduced further. A correlation between the air pressure in the chamber 48 and a lower limit of oxygen content in the deaerated water is given below.

| Air pressure in chamber (atm) | Lower limit of oxygen content in deaerated water (mg/L) |
| --- | --- |
| 1.0 | 8.1 |
| 0.7 | 6.55 |
| 0.65 | 5.8 |
| 0.6 | 5.48 |
| 0.5 | 4.97 |
| 0.4 | 4.08 |
| 0.3 | 3.1 |
| 0.2 | 1.96 |
| 0.1 | 1.14 |
| 0.03 | 0.36 |

Next, description will be made about the wafer manufacturing method according to the preferred embodiment of the present invention.

(Ingot 82)

Figure 2A:
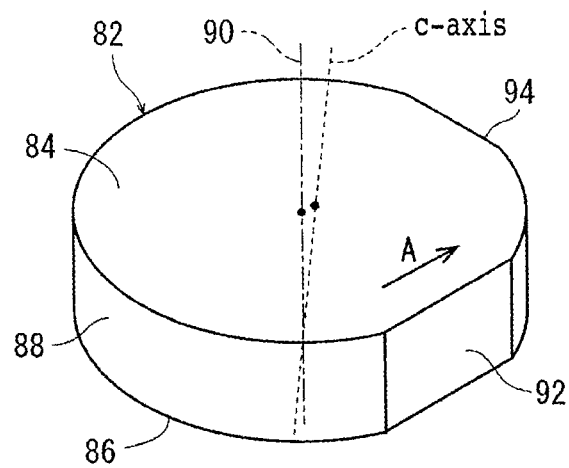
FIG. 2A is a perspective view of an ingot.
Figure 2B:
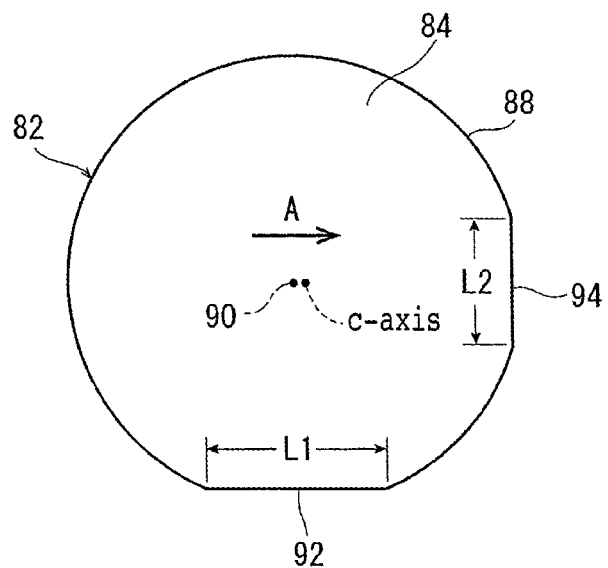
FIG. 2B is a plan view of the ingot illustrated in FIG. 2A.
Figure 2C:
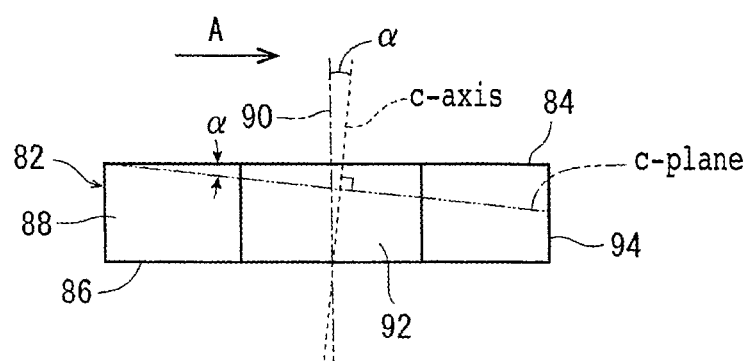
FIG. 2C is a front view of the ingot illustrated in FIG. 2A.

FIGS. 2A to 2C are a perspective view, a plan view, and a front view, respectively, of a cylindrical ingot 82 to which processing is applied by the wafer manufacturing method according to the embodiment. The ingot 82 illustrated in these figures is formed from single crystal SiC.

The ingot 82 has a circular first surface 84, a circular second surface 86 located on an opposite side to the first surface 84, a peripheral surface 88 located between the first surface 84 and the second surface 86, a c-axis extending from the first surface 84 to the second surface 86, and a c-plane orthogonal to the c-axis (see FIG. 2C). At least the first surface 84 has been planarized by grinding or polishing to such an extent that the incidence of a laser beam is not interfered with.

In the ingot 82, the c-axis is inclined with respect to a perpendicular 90 to the first surface 84, and an off-angle α (for example, α=1, 3, or 6 degrees) is formed between the c-plane and the first surface 84. The direction in which the off-angle α is formed is indicated by arrow A in FIGS. 2A to 2C.

Formed on the peripheral surface 88 of the ingot 82 are a rectangular first orientation flat 92 and a rectangular second orientation flat 94, each of which indicates crystal orientation. The first orientation flat 92 is parallel to the direction A in which the off-angle α is formed, while the second orientation flat 94 is orthogonal to the direction A in which the off-angle α is formed. As illustrated in FIG. 2B, the second orientation flat 94, when seen from above, has a length L2, which is shorter than a length L1 of the first orientation flat 92 (L2<L1).

It is to be noted that an ingot, to which processing is applied by the wafer manufacturing method of the present embodiment, is not limited to the above-described ingot 82, and may be an SiC ingot in which a c-axis is not inclined with respect to a perpendicular to a first surface and an off-angle α of 0 degrees is formed between a c-plane and the first surface (in other words, the perpendicular to the first surface and the c-axis are coincident), or an ingot formed from a material other than SiC, such as Si, $Al_2O_3$, or gallium nitride (GaN).

(Separation Starting Point Forming Step)

Figure 3A:
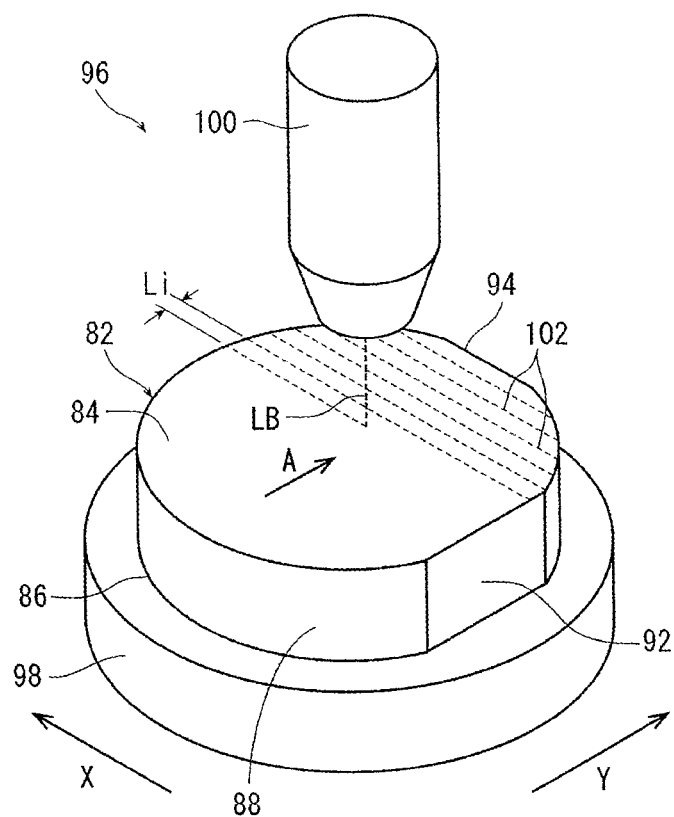
FIG. 3A is a perspective view illustrating a separation starting point forming step.
Figure 3B:
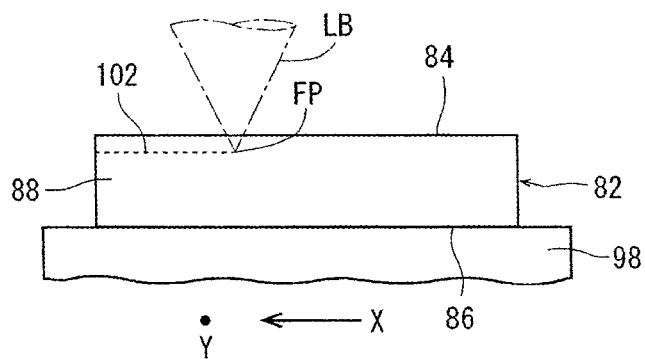
FIG. 3B is a front view illustrating the separation starting point forming step.
Figure 3C:
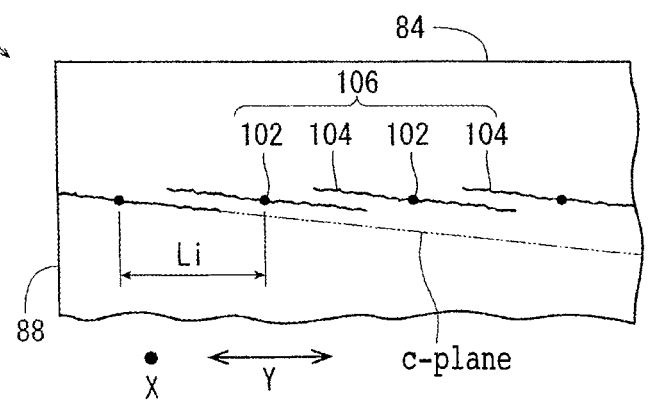
FIG. 3C is a fragmentary cross-sectional view of the ingot with a separation starting point formed therein.

FIGS. 3A and 3B are a perspective view and a front view, respectively, illustrating a separation starting point forming step of the wafer manufacturing method of the present embodiment, and FIG. 3C is a fragmentary cross-sectional view of the ingot 82 with a separation starting point formed therein. In the present embodiment, the separation starting point forming step is first performed. Described specifically, with a focal point of a laser beam having a wavelength transmittable through the ingot 82 positioned at a depth, which corresponds to the thickness of a wafer to be manufactured, from an end face of the ingot 82, the ingot 82 is irradiated with the laser beam to form modified layers, so that a separation starting point is formed.

The separation starting point forming step can be performed using, for example, a laser processing machine 96 illustrated in FIG. 3A. The laser processing machine 96 includes a chuck table 98 that holds the ingot 82 under suction, a laser oscillator (not illustrated) that emits a pulsed laser beam LB having a wavelength transmittable through the ingot 82, and a condenser 100 that condenses the pulsed laser beam LB emitted from the laser oscillator and irradiates, with the pulsed laser beam LB, the ingot 82 held under suction on the chuck table 98.

The chuck table 98 is rotatable about an axis extending in an up-down direction and is also movable in an X-axis direction indicated by arrow X in FIG. 3A and a Y-axis direction (a direction indicated by arrow Y in FIG. 3A) orthogonal to the X-axis direction. It is to be noted that an XY plane defined by the X-axis direction and the Y-axis direction is substantially horizontal.

Proceeding further with the description with reference to FIGS. 3A to 3C, the ingot 82 is first held under suction on an upper surface of the chuck table 98 with the first surface 84 directed upward in the separation starting point forming step. The ingot 82 is then imaged from above by an imaging unit (not illustrated) of the laser processing machine 96, and based on an image of the ingot 82 as captured by the imaging unit, the ingot 82 is adjusted to a predetermined direction, and a positional relation between the ingot 82 and the condenser 100 is adjusted.

When adjusting the ingot 82 to the predetermined direction, the second orientation flat 94 is brought into alignment with the X-axis direction as illustrated in FIG. 3A. As a result, a direction orthogonal to the direction A, in which the off-angle α is formed, is brought into alignment with the X-axis direction, and at the same time, the direction A in which the off-angle α is formed is brought into alignment with the Y-axis direction.

A focal point FP (see FIG. 3B) of the laser beam LB is then positioned at the depth, which corresponds to the thickness of the wafer to be manufactured, from the first surface 84 of the ingot 82. Next, while moving the focal point FP and the ingot 82 relative to each other in the X-axis direction (the direction orthogonal to the direction A in which the off-angle α is formed), the ingot 82 is irradiated from the condenser 100 with the laser beam LB having a wavelength transmittable through the ingot 82. As a result, a linear modified layer 102 in which SiC has dissociated into silicon (Si) and carbon (C) can be formed along the X-axis direction as illustrated in FIG. 3C. Cracks 104 are also formed spreading from the modified layer 102 along the c-plane (modified layer forming step).

The focal point FP and the ingot 82 are next subjected to index feeding relative to each other in the Y-axis direction (the direction A in which the off-angle α is formed) (indexing step). An index amount Li is set to have a length not exceeding a width of the cracks 104 such that the cracks 104 adjacent to each other in the Y-axis direction partly overlap as seen in the up-down direction. By alternately repeating the modified layer forming step and the indexing step, a separation starting point 106 having a plurality of modified layers 102 and a plurality of cracks 104 is then formed at the depth (separation plane) corresponding to the thickness of the wafer to be manufactured.

The separation starting point forming step as described above can be performed, for example, under the following processing conditions.

Wavelength of pulsed laser beam: 1,064 nm
Repetition frequency: 80 kHz
Average output: 3.2 W
Pulse width: 4 ns
Diameter of focal point: 10 μm
Numerical aperture (NA): 0.45
Index amount: 400 μm
Thickness of wafer to be manufacture: 700 μm (Separation Step)

Figure 4:
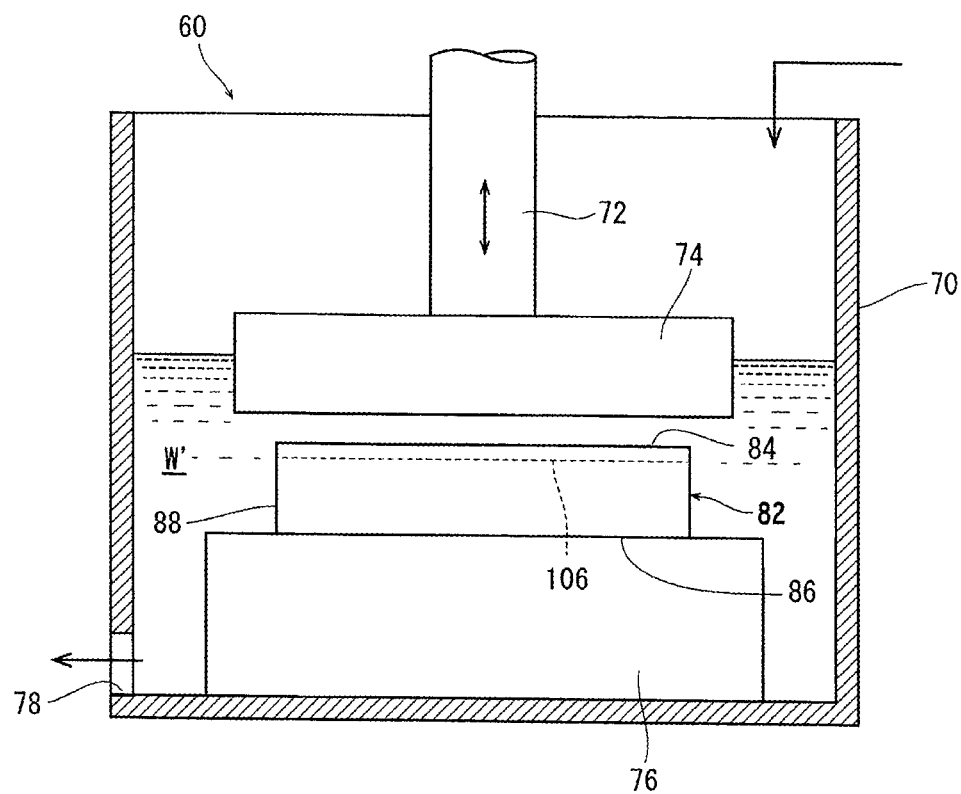
FIG. 4 is a cross-sectional view illustrating an example of a separation step.

After performing the separation starting point forming step, a separation step is performed to separate the wafer, which is to be manufactured from the ingot 82, from the separation starting point 106. The separation step can use the above-mentioned separation machine, that is, the deaerated water use machine 60. FIG. 4 is a cross-sectional view illustrating an example of the separation step.

Describing with reference to FIG. 4, the ingot 82 is first held on the holding table 76 with the wafer, which is to be manufactured, directed upward (in other words, with the first surface 84, which is the end face closer to the separation starting point 106, directed upward) in the separation step. Here, the ingot 82 may be fixed on the holding table 76 with an adhesive (for example, an epoxy-based adhesive) interposed between the second surface 86 of the ingot 82 and an upper surface of the holding table 76, or the ingot 82 may be held under suction by a suction force generated at the upper surface of the holding table 76.

Deaerated water W' is next supplied into the water bath 70 until the water level becomes higher than the upper surface of the ingot 82. The rod 72 is then lowered to position the ultrasonic oscillator 74 a little above the first surface 84 of the ingot 82. The interval between the first surface 84 and the ultrasonic oscillator 74 may be approximately 2 to 3 mm. Ultrasonic waves are next generated from the ultrasonic oscillator 74, so that the separation starting point 106 is disrupted by the ultrasonic waves via a layer of the deaerated water W' existing between the first surface 84 and the ultrasonic oscillator 74. As a result, the wafer to be manufactured from the ingot 82 can be separated from the separation starting point 106.

Figure 5:
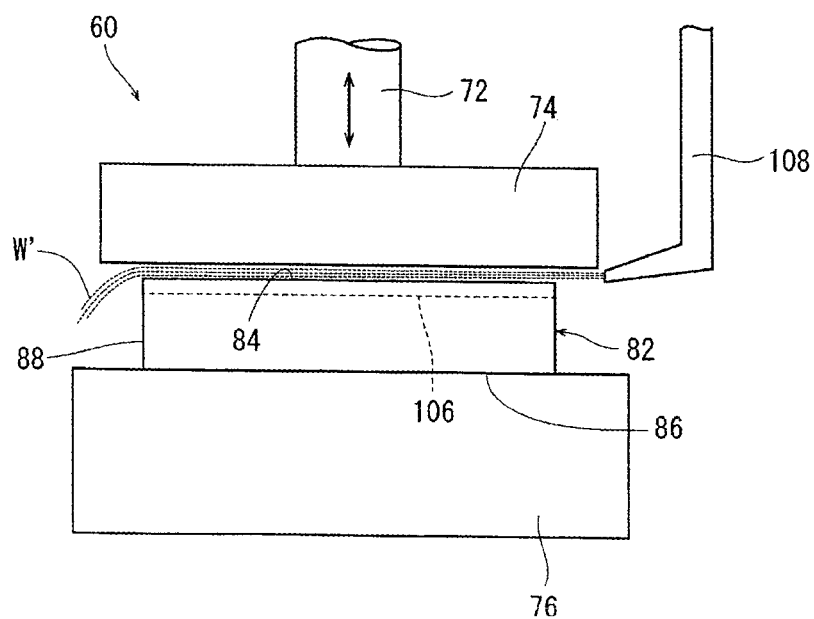
FIG. 5 is a cross-sectional view illustrating another example of the separation step.

In the example mentioned above, description is made of the example in which the deaerated water W' is stored in the water bath 70. FIG. 5 is a cross-sectional view illustrating another example of the separation step. As illustrated in FIG. 5, a layer of deaerated water W' may also be formed by supplying the deaerated water W' to a space between the first surface 84 of the ingot 82 and the ultrasonic oscillator 74 from a supply nozzle 108.

In this case, the ingot 82 is held on the holding table 76 with the wafer, which is to be manufactured, directed upward. After positioning the ultrasonic oscillator 74 a little above the first surface 84, the deaerated water W' is supplied to the space between the first surface 84 and the ultrasonic oscillator 74 from the supply nozzle 108 to form a layer of the deaerated water W'. Ultrasonic waves are next generated by the ultrasonic oscillator 74, so that the separation starting point 106 is disrupted by the ultrasonic waves via the layer of the deaerated water W' existing between the first surface 84 and the ultrasonic oscillator 74. As a result, the wafer to be manufactured from the ingot 82 can be separated from the separation starting point 106.

In the example illustrated in FIG. 4, it takes time to store the deaerated water W' in the water bath 70 and to drain the used deaerated water W' from the water bath 70 after the separation of the wafer. In the example illustrated in FIG. 5, on the other hand, the layer of the deaerated water W' can promptly be formed by supplying the deaerated water W' to the space between the first surface 84 and the ultrasonic oscillator 74 from the supply nozzle 108, and the used deaerated water W' can be drained concurrently with the application of ultrasonic waves to the ingot 82. The time of the separation step can therefore be shortened more in the example of FIG. 5 than in the example of FIG. 4.

In the present embodiment, the deaerated water W' is supplied to the end face of the ingot 82 to form the layer of the deaerated water W', and ultrasonic waves are applied to the ingot 82 via the layer of the deaerated water W' to disrupt the separation starting point 106, as described above. Accordingly, the energy of the ultrasonic waves is not converted into cavitation and can effectively be applied to the ingot 82. The wafer can therefore be efficiently separated from the ingot 82.

EXPERIMENT

A plurality of deaerated water samples were produced by changing the pressure of air in the chamber. Via a layer of each deaerated water sample, ultrasonic waves were applied to an ingot, in which separation starting point had been formed, so that the separation starting point was disrupted. The time until the separation of a wafer was measured. In addition, sound pressure (amplitude) on the ingot upon application of the ultrasonic waves to the ingot was also measured. The frequency of ultrasonic waves upon production of each deaerated water sample was set at 0.1 MHz, and the frequency of ultrasonic waves applied to the ingot upon disruption of the separation starting point was set at 25 kHz. The temperature of each deaerated water sample was set at 20° C.

<Experimental Results>

| Oxygen content in deaerated water sample (mg/L) | Time until separation (sec) | Sound pressure (V) |
|---|---|---|
| 8.1 | 1,352 | 1.54 |
| 6.55 | 1,223 | 1.56 |
| 5.8 | 1,123 | 1.66 |
| 5.48 | 1,082 | 1.68 |
| 4.97 | 1,002 | 1.88 |
| 4.08 | 815 | 1.88 |
| 3.1 | 753 | 1.88 |
| 1.96 | 356 | 2.20 |
| 1.14 | 243 | 2.32 |
| 0.36 | 236 | 3.12 |

As understood with reference to the above-described experimental results, the lower the oxygen content in the deaerated water sample, the shorter the time until the separation of the wafer from the ingot, and the higher the sound pressure on the ingot. The time until separation was 753 seconds when the oxygen content in the deaerated water sample was 3.1 mg/L, and the time until separation was 356 seconds when the oxygen content in the deaerated water sample was 1.96 mg/L. That is, the time until separation decreased to a half or less when the oxygen content in the deaerated water sample changed from 3.1 to 1.96 mg/L. Production of deaerated water having an oxygen content of 2.0 mg/L or lower is therefore preferred from the viewpoint of efficiently manufacturing wafers from an ingot.

The present invention is not limited to the details of the above-described preferred embodiment. The scope of the invention is defined by the appended claims and all changes and modifications as fall within the equivalence of the scope of the claims are therefore to be embraced by the invention.

What is claimed is:

1. A wafer manufacturing method for manufacturing a wafer from an ingot, comprising:
    a separation starting point forming step of forming a separation starting point by forming modified layers through irradiation of the ingot with a laser beam having a wavelength transmittable through the ingot with a focal point of the laser beam positioned at a depth from an end face of the ingot, the depth corresponding to a thickness of the wafer to be manufactured; and
    a separation step of separating the wafer to be manufactured from the ingot, from the separation starting point,
    wherein, in the separation step, deaerated water produced by a water production system is supplied to the end face of the ingot to form a layer of the deaerated water, and ultrasonic waves are applied to the ingot via the layer of the deaerated water, thereby disrupting the separation starting point, the water production system including a filter unit that filters water to produce clear water, an ultraviolet light irradiator that irradiates, with ultraviolet light, the clear water produced by the filter unit, thereby degrading organic matter in the clear water, an ion exchange resin unit that purifies the clear water, in which the organic matter has been degraded by the ultraviolet light irradiator, into pure water, and a deaerated water production unit that deaerates the pure water to produce the deaerated water, the deaerated water production unit including a chamber that receives the pure water and a depressurizer that reduces pressure in the chamber.

2. The wafer manufacturing method according to claim 1, wherein the ingot is an SiC ingot.

3. The wafer manufacturing method according to claim 2, wherein the SiC ingot has a first surface, a second surface on an opposite side to the first surface, a c-axis extending from the first surface to the second surface, and a c-plane orthogonal to the c-axis, the c-axis is inclined with respect to a perpendicular to the first surface, and an off-angle is formed between the c-plane and the first surface, and
the separation starting point forming step includes
    a modified layer forming step of forming a linear modified layer by moving the focal point of the laser beam and the SiC ingot relative to each other in a direction orthogonal to a direction in which the off-angle is formed, and
    an indexing step of subjecting the focal point of the laser beam and the SiC ingot to index feeding by a predetermined amount by moving the focal point and the SiC ingot relative to each other in the direction in which the off-angle is formed.

4. The wafer manufacturing method according to claim 1, wherein the deaerated water production unit further includes a water receiving port through which the pure water is received into the chamber, an ultrasonic oscillator that applies ultrasonic waves to the pure water in the chamber, and a deaerated water outflow port through which the deaerated water flows out of the chamber.

5. The wafer manufacturing method according to claim 1, further comprising:
    generating ultrasonic waves of 0.1 to 1.0 MHz with an ultrasonic oscillator, and
    reducing the pressure to 0.2 atm or lower in the chamber with the depressurizer.

6. The wafer manufacturing method according to claim 1, further comprising:
    producing deaerated water having an oxygen content of 2.0 mg/L or lower with the deaerated water production unit.

7. The wafer manufacturing method according to claim 1, wherein the deaerated water production unit is arranged in a circulation route that supplies the deaerated water to a deaerated water use machine and receives used deaerated water drained from the deaerated water use machine.

* * * * *